US012637628B2

(12) United States Patent　　　　(10) Patent No.: US 12,637,628 B2

Begeal et al.　　　　　　　　　　　　(45) Date of Patent: May 26, 2026

(54) COMPOSITIONS AND METHODS FOR SCAVENGING HYDROGEN SULFIDE

(71) Applicant: Foremark Performance Chemicals, League City, TX (US)

(72) Inventors: James Begeal, Cypress, TX (US); Chris Williamson, Montgomery, TX (US); Ali Yousef, Tomball, TX (US); Dallas Watson, Guthrie, OK (US)

(73) Assignee: Foremark Performance Chemicals, Houston, TX (US)

( * ) Notice: Subject to any disclaimer, the term of this patent is extended or adjusted under 35 U.S.C. 154(b) by 0 days.

(21) Appl. No.: 18/437,917

(22) Filed: Feb. 9, 2024

(65) Prior Publication Data

US 2024/0228897 A1　　Jul. 11, 2024

Related U.S. Application Data

(62) Division of application No. 18/143,215, filed on May 4, 2023, now Pat. No. 11,946,008.

(60) Provisional application No. 63/338,203, filed on May 4, 2022.

(51) Int. Cl.
　　*C10L 3/10*　　　　(2006.01)
　　*B01D 53/14*　　　(2006.01)

(52) U.S. Cl.
　　CPC ..........　*C10L 3/103* (2013.01); *B01D 53/1468* (2013.01); *B01D 53/1493* (2013.01); *B01D 2252/20478* (2013.01); *B01D 2252/205* (2013.01); *B01D 2252/502* (2013.01); *B01D 2252/602* (2013.01); *C10L 2290/545* (2013.01)

(58) Field of Classification Search
　　CPC . C10L 3/103; B01D 53/1468; B01D 53/1493; B01D 2252/20478; B01D 2252/205; B01D 2252/502; B01D 2252/602
　　USPC ........................................................ 423/229
　　See application file for complete search history.

(56) References Cited

U.S. PATENT DOCUMENTS 6,267,938 B1 * 7/2001 Warrender ......... B01D 53/1468
　　　　　　　　　　　　　　　　208/208 R

* cited by examiner

*Primary Examiner* — Anita Nassiri-Motlagh

(74) *Attorney, Agent, or Firm* — King & Spalding

(57)　　　　　　　ABSTRACT

This invention provides compositions and methods that inhibit formation of alkenyl sulfide polymers and allow the hydrogen sulfide to be removed when scavenging hydrogen sulfide by reaction with aldehydes.

19 Claims, 3 Drawing Sheets

Diagram 1

Diagram 2

Diagram 1

Diagram 2

Fig. 1

COMPOSITIONS AND METHODS FOR SCAVENGING HYDROGEN SULFIDE

CROSS-REFERENCE TO RELATED APPLICATIONS

This application is a divisional application of and claims priority to U.S. application Ser. No. 18/143,215, filed May 4, 2023, which in turn claims the benefit of the priority to U.S. Provisional Application No. 63/338,203, filed on May 4, 2022. The disclosures of U.S. application Ser. No. 18/143, 215 and U.S. Provisional Application No. 63/338,203 are incorporated herein by reference in their entirety.

FIELD OF THE INVENTION

The present invention generally relates to inhibiting condensation polymerizations, m particular aldehyde-sulfide condensations, as well as to the synthesis and composition of amine bi-terminated, telechelic oligomers. In one aspect, such inhibition has utility in the removal of hydrogen sulfide (H2S), from gaseous and liquid process streams, including natural gas, petroleum, and wastewater.

BACKGROUND

This section introduces information that may be related to or provide context for some aspects of the compositions or processes described herein and/or claimed below. This information is background facilitating a better understanding of the disclosed subject matter. Such background may include a discussion of related art. That such art is related in no way implies that it is also prior art. The related art may or may not be prior art. The discussion is to be read in this light, and not as admissions of prior art.

Natural gas and petroleum in geologic formations often contain hydrogen sulfide, a malodorous, corrosive, toxic gas. Gas or oil containing hydrogen sulfide is known as "sour" gas or oil. The concentration of hydrogen sulfide in natural gas or petroleum may range from 0.1 ppm to greater than 150,000 ppm. Natural gas or petroleum streams without hydrogen sulfide or that have been treated to remove at least some amount of hydrogen sulfide are treated streams, often called "sweet" streams, relative to untreated streams containing hydrogen sulfide. Many industrial process and municipal wastewater streams also contain hydrogen sulfide. This wastewater containing hydrogen sulfide is also referred to as "sour". The hydrogen sulfide concentration in wastewater typically may range from 0.1 ppm to 64.000 ppm. Process or waste streams without hydrogen sulfide are called "sweet" streams.

Because of the odor, corrosivity, and toxicity of hydrogen sulfide, hydrogen sulfide is typically removed from the streams produced or processed. In some cases, the hydrogen sulfide is removed immediately after production or in initial storage, i.e., "upstream". In other cases, the hydrogen sulfide is removed during or after transport to intermediate storage, i.e., "midstream". In other cases, the hydrogen sulfide is removed at the stream's final industrial destination, i.e., "downstream". In the case of wastewater, it is removed before discharge, from the "waste stream". Hydrogen sulfide may be removed at any or all of these locations.

To remove hydrogen sulfide from process streams, the sulfides are often reacted with aldehydes and/or aldehyde releasers (i.e., compositions that release aldehydes), known as "aldehyde sulfide scavengers".

Examples of aldehyde sulfide scavengers and scavenging processes employing aldehyde sulfide scavengers are disclosed in, for example, U.S. Pat. No. 5,169,411 to Weers; U.S. Pat. No. 7,985,881 to Westlund et al.; U.S. Pat. No. 10,093,868 to Weers; U.S. Pat. No. 10,196,343 to Harrington et al.; U.S. Pat. No. 10,308,886 to Rana et al.; U.S. Pat. No. 10,119,079 to Fuji et al.; U.S. Pat. No. 10,294,428 to Suzuki et al.; and U.S. Pat. No. 10,513,662 to Weers et al., U.S. Patent Application Publication No. 2020/0024526, now U.S. Pat. No. 10,829,699, to Weers et al., and U.S. Patent Application Publication No. 2019/0322948 by Begeal et al., each of which is incorporated herein by reference in its entirety to the extent not inconsistent herewith.

Examples of gas-liquid contactors for treating sour gas are described by Isom, C., et al., "Sour Gas Treatment Gets More Flexible", *Chemical Engineering*, 1994, vol. 101, no. 7, 147-148; U.S. Pat. No. 6,136,282, to Kevin S. Fisher; and U.S. Pat. No. 10,876,052 to S. Ramkumar, et al.

Removal of hydrogen sulfide gas with a reactive liquid solution of aldehyde or aldehyde releaser scavenger can be done by direct addition to the flowing stream or in a gas-liquid contactor or scrubber, such a bubble column, packed column, or tray column; or by other means to increase gas/liquid contact time and/or surface area. Hydrogen sulfide in sour liquid streams can be sparged or stripped into the gas phase, and that gas phase sent to a gas-liquid contactor, or direct liquid-liquid contact can be used. The spent reaction liquid, comprising fully or mostly reacted scavenger, can be removed and optionally replaced with fresh scavenger all at once batchwise, or the spent reaction liquid can be continuously blown down to a wastewater facility or otherwise discarded and replenished with fresh scavenger at a controlled rate.

The reaction of hydrogen sulfide with aldehydes or aldehyde releasers, regardless of which is used, produces high molecular weight, water-insoluble, sticky (adhesive), amorphous, solid polymers of the corresponding alkylene sulfide. As the reaction proceeds and the aldehyde is increasingly spent (becomes depleted), the amount and molecular weight of the alkylene sulfide polymer formed increases, eventually becoming a water-insoluble, sticky (adhesive), solid mass. These solids eventually foul the process equipment, limiting the utility of this reaction for scavenging hydrogen sulfide. Fouling in the treated line (treatment vessel or treatment zone), contact tower, and/or wastewater stream caused by this insoluble, solid polymer is one of the substantial limitations of using aldehydes and/or aldehyde releasers as sulfide scavengers.

The fouling from alkylene sulfide polymers is more extensive forpoly(methylene sulfides), including those with no terminal amine, such as the ones formed from formaldehyde or hemiformals, and those with only one terminal (unreleasable) amine formed from formaldehyde amine adducts like triazine. (cf Synthesis, Reaction Byproducts Characterization, and Mechanistic Understanding of Hemiformal Hydrogen Sulfide Scavengers: Part 2-Identification of Byproducts, Reaction Mechanism, and Suppression Thereof; J. J. Wylde et al., *Energy Fuels*, 2022, 36, 2, 851-860). Amorphous polydithiazine (ap-DTZ) formed in part from triazine, is a poly(methylene sulfide) mono-terminated with one unreleasable amine, but free to grow from the other end, is known to be especially troublesome. (cf G. N. Taylor et. al., "Structural Elucidation of the Solid By-product 'Amorphous Dithiazine' from the Use of 1,3,5-Tris (hydroxyalkyl)-hexahydro-s-triazine Based Hydrogen Sulfide Scavengers, *Industrial & Engineering Chemistry Research*, 2011, 50, 735-740). It is generally accepted that all such alkylene sulfide polymers, even if terminated by one unreleasable amine, like ap-DTZ, are sticky (adhesive) solids, insoluble in water and all common organic solvents.

The traditional method of minimizing fouling by alkylene sulfide polymers is to replace the entirety, or continuously remove a portion, of the reaction mixture when the aldehyde or aldehyde releaser scavenger is only partly spent (partially depleted) before the polymer can grow to a size where it precipitates as a solid and sticks (adheres) to surfaces. Since the total concentration of the active and spent scavenger is limited by the fixed volume of the contactor (treatment vessel or treatment zone), this limits the concentration of active scavenger that can be used, reducing the rate at which hydrogen sulfide can be removed. This also wastes a certain amount of still active (unreacted) scavenger in the discard. The more efficiently the contactor (process) is operated, at higher concentrations of spent scavenger, the less active scavenger goes to waste, but this lowers the effectiveness of the process for removing hydrogen sulfide and increases the amount of fouling. A need thus exists for ways to overcome or avoid this inherent tradeoff, and more generally for more efficient ways of reducing solids formation during hydrogen sulfide scavenging.

SUMMARY OF THE INVENTION

The invention provides compositions and methods that employ ethylamine as an inhibitor component that inhibits the polymerization that forms solid alkenyl sulfide polymers and allow hydrogen sulfide to be removed by reaction with aldehydes without fouling process equipment. One aspect of the invention is the recognition that ethylamine can be added in substoichiometric amounts relative to the aldehyde scavenger to reduce, minimize, or essentially eliminate the formation of undesirable solid waste products that would otherwise foul the process equipment. In addition, the invention recognizes that the use of substoichiometric amounts of ethylamine, as described herein, not only suppresses the formation of undesirable solid waste products, but also lowers the health and flammability risks associated with ethylamine, while providing cost savings due to the lesser amount of ethylamine needed.

Another aspect of the invention is directed to compositions and methods in which the hydrogen sulfide scavenging reaction products are liquid oligomers that do not stick (adhere) to and foul vessels or equipment. Still another aspect of the invention is directed to compositions and methods in which streams containing hydrogen sulfide (sour streams) are contacted with treatment solutions (i.e., scavenging compositions) to reduce the sulfur content of the sour stream by forming liquid oligomers ahead of (before entering) a liquid-liquid separator, which liquid oligomers are water-insoluble and immiscible with, and of a different density than, the remaining scavenger solution (containing unreacted scavenger) present in the liquid-liquid separator. The products of the scavenging reaction (the oligomers) on the one hand, and the scavenger (treatment) solution containing unreacted scavenger on the other, can be separated following the scavenger solution liquid-hydrogen sulfide contact, and the inhibitor-terminated liquid oligomers formed by the scavenging reaction can be removed from the scavenger solution that contains unreacted scavenger, and optionally discarded or reprocessed. In another aspect, the so removed oligomer is reprocessed to recover the inhibitor component (ethylamine) from the oligomer by alkaline hydrolysis and distillation or solvent extraction for recycling the inhibitor back to the treatment system. By such a method, there is little or no net consumption of the inhibitor.

In another aspect there is provided a treatment solution (sometimes alternatively referred to herein as a treatment composition, scavenging composition, or scavenging solution) formed from ingredients comprising a) an aldehyde and/or an aldehyde releaser, and b) ethylamine, wherein there is less than one molar equivalent of ethylamine in relation to the total amount of aldehyde provided by a). These compositions are sometimes referred to herein as scavenging compositions or treatment solutions.

In another aspect there is provided a method for preparing a treatment solution, which method comprises combining a) an aldehyde and/or an aldehyde releaser, and b) ethylamine, wherein there is less than one molar equivalent of ethylamine in relation to the total amount of aldehyde provided by a).

In another aspect there is provided a method of scavenging hydrogen sulfide from a stream containing an undesirable amount of hydrogen sulfide, the method comprising:

contacting the stream containing an undesirable amount of hydrogen sulfide with a treatment solution, the treatment solution formed from ingredients comprised of a) an aldehyde and/or aldehyde releaser and b) ethylamine, to form a treated stream and a spent scavenger solution phase comprising ethylamine-terminated alkenyl sulfide oligomers and/or polymers, wherein less than one molar equivalent of ethylamine in relation to the total amount of aldehyde provided by a) is used to form the treatment solution.

In some aspects, this method further comprises separating the ethylamine-terminated alkenyl sulfide oligomers and/or polymers from the spent scavenger solution phase, and may further comprise hydrolyzing the ethylamine-terminated alkenyl sulfide oligomers and/or polymers with alkali to release ethylamine, and optionally recovering therefrom at least a portion of the ethylamine. In other aspects, at least a portion of the ethylamine is recovered, and the method further comprises recycling the recovered ethylamine to treat another stream containing an undesirable amount of hydrogen sulfide or to be part of a treatment solution.

Still another aspect of the invention provides a composition comprising on average the polymerization reaction product of 2 moles of ethylamine, n moles of hydrogen sulfide, and n+1 moles of an aldehyde, and n can be in the range of about 1 to about 12. In some aspects of the invention, the aldehyde of the composition comprises formaldehyde. In some aspects of the invention, n is in the range of about 3 to about 10, while in other aspects, n is in the range of about 7 to about 9.

BRIEF DESCRIPTION OF THE DRAWINGS

For a more complete understanding of the present invention, reference is now made to the accompanying drawings.

FIG. 1 contains two diagrams depicting chemical equations discussed below.

Figure 2:
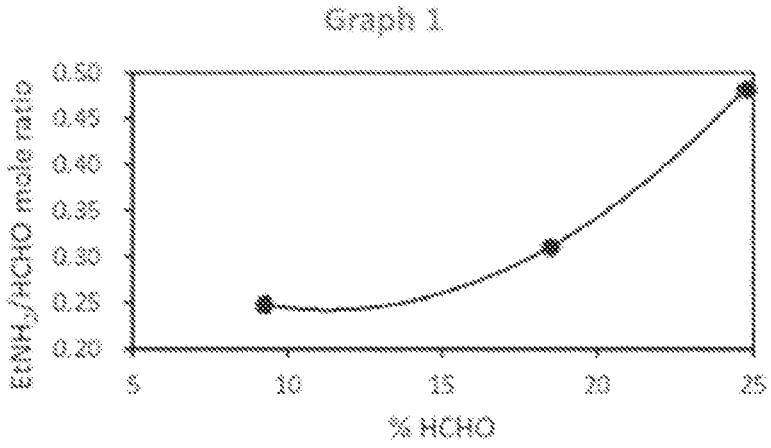
FIG. 2 contains two graphs showing the relationship between certain variables in the experiments described herein.
Figure 2:
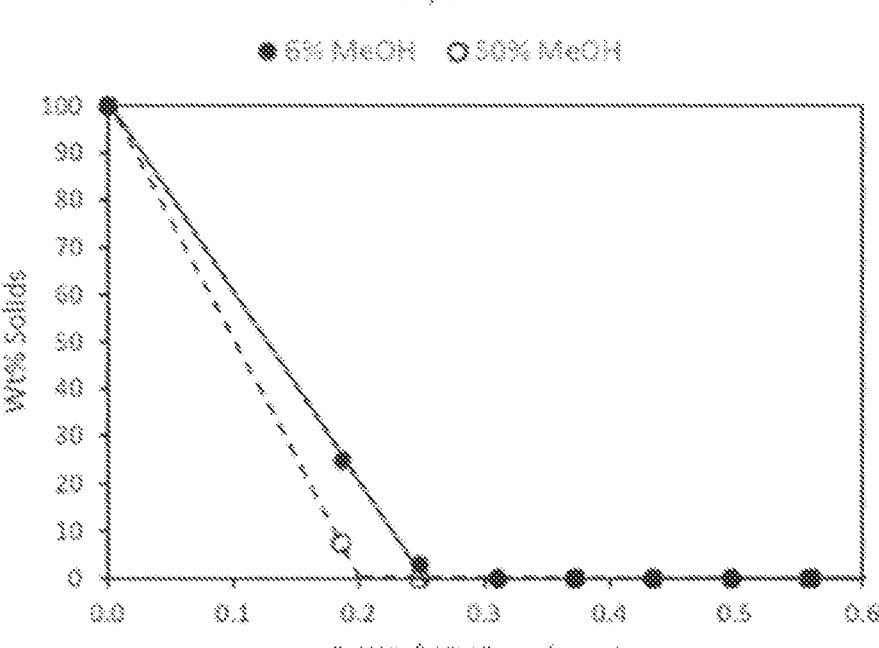

While the claimed subject matter is susceptible to various modifications and alternative forms, the drawing(s) illustrate a specific embodiment of the invention described in detail by way of example. It should be understood, however, that the description herein of specific embodiments is not intended to limit the claimed subject matter to the particular forms disclosed, but on the contrary, the intention is to cover all modifications, equivalents, and alternatives falling within the spirit and scope as defined by the appended claims.

DETAILED DESCRIPTION OF EXEMPLARY EMBODIMENTS OF THE INVENTION

To define more clearly the terms used in this disclosure, the following definitions are provided. Unless otherwise indicated, the following definitions are applicable to this disclosure. Terms that do not appear below have their ordinary and customary meaning understood in the context of this disclosure by a person of ordinary skill in the art relating to the technical field of this disclosure. To the extent that any definition or usage provided by any document incorporated here by reference conflicts with the definition or usage provided herein, the definition or usage provided in this disclosure controls.

In this disclosure, features of the subject matter are described such that, within particular aspects, a combination of different features can be envisioned. For each and every aspect and each and every feature disclosed herein, all combinations that do not detrimentally affect the designs, systems, compositions, processes, or methods described herein are contemplated with or without explicit description of the particular combination. Additionally, unless explicitly recited otherwise, any aspect or feature disclosed herein can be combined to describe inventive designs, systems, compositions, processes, or methods consistent with this disclosure.

In this disclosure, while compositions and/or processes or methods are often described in terms of "comprising" various components or steps, the compositions and methods can also "consist essentially of" or "consist of" the various components or steps, unless stated otherwise. For example, a process consistent with aspects of the disclosed subject matter can comprise; alternatively, can consist essentially of; or alternatively, can consist of; the process steps indicated.

The terms "a," "an," and "the" are intended to include plural alternatives, e.g., at least one, one or more, and one or more than one, unless otherwise specified.

The terms "contacting" or "bringing together" are used herein to describe systems, compositions, processes, and methods in which the specified components or materials are contacted, combined, or brought together in any order, in any manner, and for any length of time, unless otherwise specified. For example, the components can be combined by blending or mixing, or co-feeding, using any suitable technique known to one of skill in the art to which this disclosure pertains, unless otherwise indicated.

The term "about" as used herein means that amounts, sizes, formulations, parameters, or other quantities or characteristics modified by this term need not be exact, but may be approximate including being larger or smaller, as desired, reflecting tolerances, conversion factors, rounding off, measurement errors that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like, including other factors known to those of skill in the art. Unless otherwise expressly provided, an amount, size, formulation, parameter or other quantity or characteristic stated herein is "about" or "approximate"

whether or not expressly stated to be such. The term "about" also encompasses amounts that differ due to different equilibrium conditions for a composition resulting from a particular initial mixture. Whether or not modified by the term "about," the claims include equivalents to the stated quantities.

Various numerical ranges are disclosed herein. When a range of any type is disclosed or claimed herein (e.g., "ranging from . . . ", "in a range of from . . . ", "in the range of from . . . ", "in a range of from", "in a range of") the intent is to disclose or claim individually each possible number that such a range could reasonably encompass, including end points of the range as well as any sub-ranges and combinations of sub-ranges encompassed therein, unless otherwise specified.

Embodiments disclosed herein can provide the materials listed as suitable for satisfying a particular feature of the embodiment delimited by the term "or." For example, a particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

Although any methods and materials similar or equivalent to those described herein can be used in the practice or testing of the subject matter described herein, the typical methods and materials are herein described.

As used throughout this document, the term "sour stream" refers to a gas or liquid containing an undesirable amount of hydrogen sulfide. Similarly, the phrase "sour gas stream" refers to a gas containing an undesirable amount of hydrogen sulfide, such as natural gas (methane), and the phrase "sour liquid stream" refers to a liquid containing an undesirable amount of hydrogen sulfide. Sour liquid streams can be oil-based ("sour oil streams"), such as those from petroleum drilling, or aqueous, such as wastewater.

As used throughout this document, the term "sweet stream" refers to a gas or liquid that does not contain hydrogen sulfide or that has been treated to remove at least some amount of hydrogen sulfide. Similarly, the phrase "sweet gas stream" refers to a gas that does not contain hydrogen sulfide or that has been treated to remove at least some amount of hydrogen sulfide, such as natural gas (methane), and the phrase "sweet liquid stream" refers to a liquid that does not contain hydrogen sulfide or that has been treated to remove at least some amount of hydrogen sulfide, i.e., the treated stream has a reduced concentration of hydrogen sulfide as compared to the stream containing an undesirable amount of hydrogen sulfide. Sweet liquid streams can be oil-based ("sweet oil streams"), such as those from petroleum drilling, or aqueous, such as wastewater. Streams that have been treated to remove at least some amount of hydrogen sulfide are referred to as treated streams throughout this document.

Throughout this document, alkylene sulfide oligomers and polymers are sometimes referred to as aldehyde sulfide oligomers and polymers.

As used throughout this document, the phrases "remaining scavenger solution," "spent reaction liquid," "spent scavenging solution," and "spent scavenger solution," refer to a scavenger solution containing unreacted components. The unreacted components typically include an aldehyde and/or aldehyde releaser with or without ethylamine. In some embodiments, the spent scavenger solution is a spent scavenger solution phase comprising ethylamine-terminated alkenyl sulfide oligomers and/or polymers.

Throughout this document, liquid telechelic oligomers (more correctly referred to as ethylamine-bi-terminated alkenyl sulfide oligomers and/or polymers), are sometimes referred to as inhibitor-terminated alkenyl sulfide oligomers and/or polymers, ethylamine bi-terminated telechelic oligomers, or ethylamine-terminated alkenyl sulfide oligomers and/or polymers.

The present disclosure is directed to methods in which a hydrogen sulfide scavenging reaction produces products that are liquid oligomers that do not stick (adhere) to and foul vessels or equipment. The present disclosure is also directed scavenging compositions useful for producing scavenging reaction products that are liquid oligomers that do not stick to and foul vessels or equipment. Further embodiments are directed to compositions and methods in which hydrogen-sulfide-containing streams are contacted with treatment solutions (scavenging compositions) to form liquid oligomers ahead of (before entering) a liquid-liquid separator. The liquid oligomers are water-insoluble and immiscible with, and of a different density than, the remaining scavenger solution (containing unreacted scavenger) which is present in the liquid-liquid separator, such that the products of the scavenging reaction (the oligomers) and the scavenger solution containing unreacted scavenger can be separated following the scavenger solution liquid-hydrogen sulfide contact, and the inhibitor-terminated liquid oligomers formed by the scavenging reaction can be removed from the scavenger solution containing unreacted scavenger, and optionally discarded or reprocessed. In one embodiment, the so removed oligomer is reprocessed to recover the inhibitor component (ethylamine) by alkaline hydrolysis and distillation or solvent extraction, optionally for recycling back to the system. In this method, there is little to no net consumption of the inhibitor.

In some embodiments, the aldehyde is in the form of an aldehyde releaser. In other embodiments, the aldehyde is a combination of an aldehyde and an aldehyde releaser. When a combination of an aldehyde and an aldehyde releaser is used, or more than one aldehyde and/or aldehyde releaser is used, the molar amount of aldehyde is the total amount of aldehyde provided by aldehydes and/or aldehyde releasers in the composition.

Common aldehydes employed include formaldehyde, benzaldehyde, furfural, acrolein, glutaraldehyde, and glyoxal; any combination of two or more of the foregoing aldehydes can be used; formaldehyde is particularly preferred aldehyde. Common aldehyde releasers include various reaction products of aldehydes, especially formaldehyde, with primary or secondary amines, especially methylamine; alkanolamines, especially ethanolamine; or alcohols, especially ethanol; combinations of aldehyde releasers can be used if desired. Cyclic 1:1 adducts of formaldehyde and amines, known as triazines, e.g., 1,3,5-tris(hydroxyethyl)-hexahydro-s-triazine, are particularly popular.

In some embodiments, the scavenging composition is formed from ingredients consisting essentially of a) an aldehyde and/or aldehyde releaser, b) ethylamine, and c) water; and there is less than one molar equivalent of ethylamine in relation to the total amount of aldehyde provided by a). In other embodiments, the scavenging composition is formed from ingredients consisting essentially of formaldehyde, ethylamine, methanol, and water; and there is less than one molar equivalent of ethylamine in relation to the amount of formaldehyde.

In other embodiments, the scavenging composition is formed from ingredients consisting of a) an aldehyde and/or aldehyde releaser, b) ethylamine, and c) water, and there is less than one molar equivalent of ethylamine in relation to the total amount of aldehyde provided by a). In still other embodiments, the scavenging composition is formed from ingredients consisting of formaldehyde, ethylamine, methanol, and water, wherein there is less than one molar equivalent of ethylamine in relation to the amount of formaldehyde.

In the scavenging of hydrogen sulfide from streams containing an undesired amount of hydrogen sulfide with aldehydes and/or aldehyde releasers in the practice of this invention, the formation and precipitation of solid, water-insoluble alkylene-sulfide polymers, resulting from the condensation of aldehydes, free or released, with hydrogen sulfide, is reduced or prevented by limiting the size and shape (structure) of the alkylene sulfide polymers with less than one molar equivalent of ethylamine in relation to the amount of aldehyde. Adding less than one molar equivalent of ethylamine to the sour stream renders the aldehyde scavenger/hydrogen sulfide reaction products liquid, free flowing, and immiscible in the spent scavenger solution (which may contain unreacted scavenger).

In some embodiments, some amount of solids are present in the spent scavenger solution phase, but the spent scavenger solution phase has a reduced amount of solids formation as compared to a spent scavenger solution phase formed using same method but carried out in the absence of ethylamine.

The polymers or oligomers formed in the presence of the less than one molar amount of ethylamine are theorized to be polydisperse with a range of degrees of polymerization (DP) and/or molecular weights (MW), centering on an average. Above a certain DP or MW, an oligomer will be solid rather than liquid Polymers or oligomers with higher average MWs and/or higher average DPs will thus have a larger fraction of solids. An average DP of 9 or an average MW of 517 Daltons was found to be low enough that all the oligomers were liquid, with no solids formed.

Figure 1:
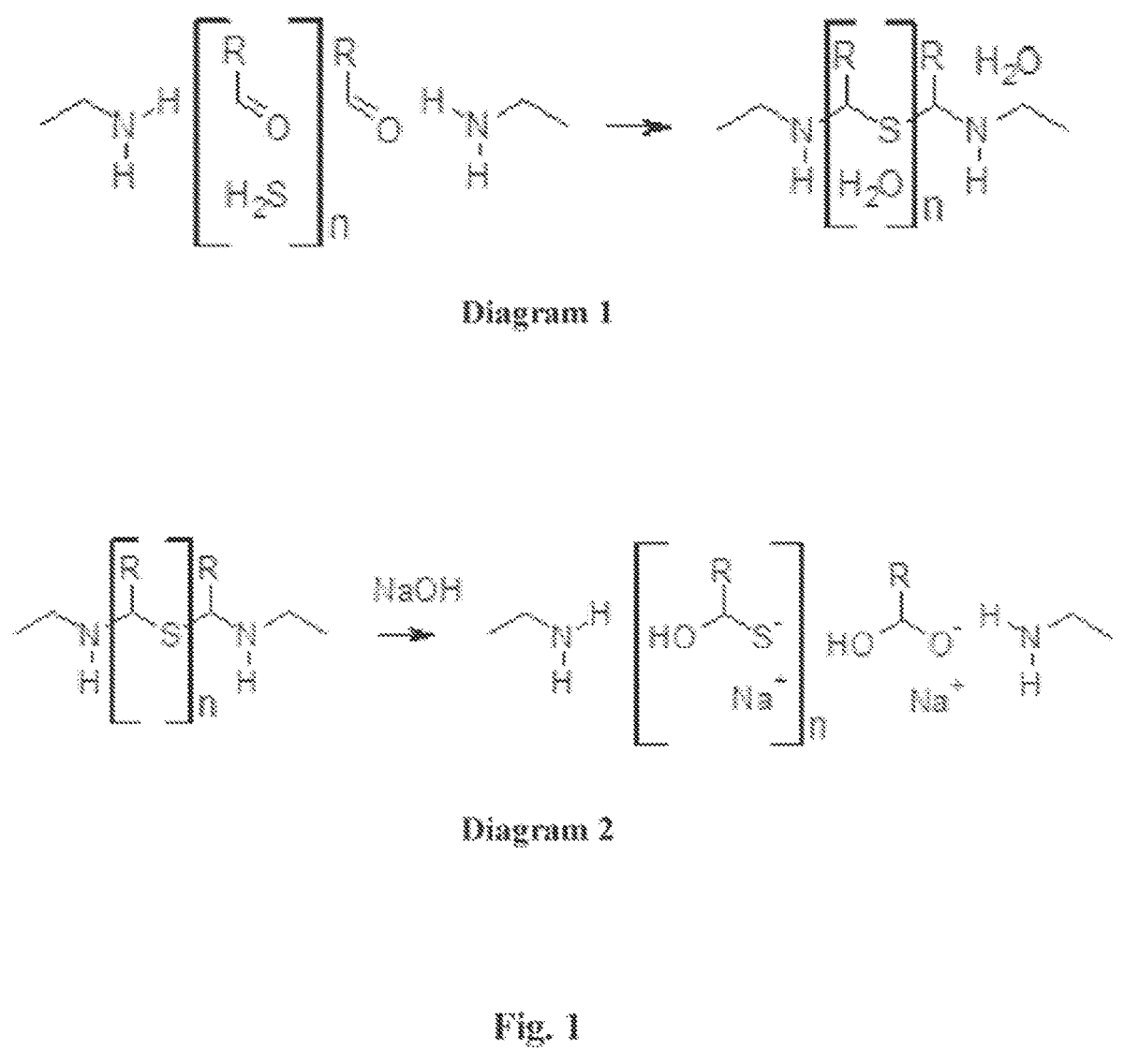

Diagram 1, shown in FIG. 1, depicts an embodiment of a stoichiometrically depicted reaction sequence wherein a combination of "n" H2S molecules and "n" aldehyde-containing compounds R——=O (shown together in brackets on the left side of the arrow), an additional aldehyde-containing molecule (R——=O), and two ethylamine molecules are present as reactants in a chemical system.

In the embodiment depicted in Diagram 1, a condensation reaction occurs whereby an ethylamine bi-terminated telechelic oligomer, Et(H)N—[C(H)(R)S]n-C(H)(R)—N(H) Et, of degree of polymerization "n", and "n"+1 molecules of water (H20) are produced. (As used herein, "Et" is sometimes used to refer to an ethyl group, CH3CH2-.) In certain embodiments, "R" on the aldehyde can be hydrogen, alkyl, alkenyl, aryl, or carbonyl. In certain embodiments, "n" can be from 1 to 9.

In one embodiment, as little as 0.2 molar equivalents of ethylamine per mole of formaldehyde was sufficient to limit the average degree of polymerization (DP) to no more than 9, and an average molecular weight (MW) no more than 517 Daltons. This was the Minimum Effective Inhibitor (MEI) mole ratio for elimination of all solids under aggressive scavenging to total reaction of the scavenger in the scavenging solution when the aldehyde was formaldehyde. The dose response indicated no threshold for inhibition—the fraction of solids in the precipitate was reduced to zero linearly with addition of ethylamine up to the molar ratio at which no solids form (the zero-solids ratio). Any amount of ethylamine added reduced the formation of solids.

Ethylamine was found to be unique in its ability to terminate both ends of the aldehyde-sulfide polymer unreleasably and form a separate phase comprising the liquid telechelic oligomers (ethylamine-terminated alkenyl sulfide oligomers). Surprisingly, similar amines such as methylamine and ethanolamine, released from amine-adduct type aldehyde releasers, such as imines and triazines, by displacement with hydrogen sulfide, were not found to inhibit the sulfide polymerization. These other amines allowed the formation, and are well known to allow the formation, of sticky (adhesive), solid polymers. It is not understood why ethylamine is unique in this ability. Without being bound by any theory, it is speculated that alternative amines fail to form separate phase, liquid telechelic oligomers for different reasons. It is thought, for example, that alkanolamines, such as ethanolamine, crosslink or re-initiate polymerization to a high MW via sulfide substitution on the hydroxyl, prior to which they are easily released from the polymer terminus, presumably due to the water solubility imparted by the hydroxyl (cf G. N. Taylor et. al., "Identification of the Molecular Species Responsible for the Initiation of Amorphous Dithiazine in Laboratory Studies of 1,3,5-Tris(hydroxyethyl)-hexahydro-s-triazine as a Hydrogen Sulfide Scavenger," *Industrial & Engineering Chemistry Research,* 2012, 51, 11613-11617). Methylamine is thought to be too volatile (boiling point 21° F., −6.3° C.) to stay in solution at ordinary process temperatures. Propyl and higher alkyl amines are thought to be too sterically hindered to react fast enough or bond tightly enough to limit the MW sufficiently and/or have melting points that are too high to form polymers that phase separate as liquids at process temperatures.

Testing of other amines to determine if they have the same impact on the by-product polymerization, as outlined above, provided undesirable results, and ethylamine was the only compound found to produce a liquid polymeric by-product. As would be understood by one skilled in the art, amines are classified into aliphatic, aromatic and heterocyclic amines that can be primary, secondary, or tertiary in functionality. Examples of primary amines that were tested included methylamine, ethanolamine, propylamine, propanolamine, isopropylamine, isopropanolamine, n-butylamine, n-butanolamine, aniline, and 4-methylaniline. Examples of secondary amines that were tested included dimethylamine, diethylamine, diethanolamine, dipropylamine, dipropanolamine, diisopropylamine, diisopropanolamine, dibutylamine, dibutanolamine, n-methylaniline, diphenylamine, pyrrolidine, and piperidine. Examples of tertiary amines that were tested included trimethylamine, triethylamine, triethanolamine, tripropylamine, methyl diethanolamine, dimethylethanolamine, diethylethanolamine, and pyridine. All of the listed amines above were tested at various stoichiometric and sub-stoichiometric ratios and produced no detectable liquid polymeric by-products.

In another aspect, the invention provides a method for scavenging hydrogen sulfide by a process comprising:

contacting a stream containing an undesirable amount of hydrogen sulfide with a solution comprised of a) an aldehyde and/or aldehyde releaser to form a treated stream and a spent scavenger solution phase, characterized in that ethylamine is added to the stream containing an undesirable amount of hydrogen sulfide, and the spent scavenger solution phase comprises ethylamine-terminated alkenyl sulfide oligomers and/or polymers, wherein there is less than one molar equivalent of ethylamine in relation to the amount of aldehyde provided by a) to the stream containing an undesirable amount of hydrogen sulfide.

In some aspects, this method further comprises separating the ethylamine-terminated alkenyl sulfide oligomers and/or polymers from the spent scavenger solution phase, and may further comprise hydrolyzing the ethylamine-terminated alkenyl sulfide oligomers and/or polymers with alkali to release ethylamine, and optionally recovering therefrom at least a portion of the ethylamine. In other aspects, at least a portion of the ethylamine is recovered, and the method further comprises recycling the recovered ethylamine to a stream containing an undesirable amount of hydrogen sulfide or to be part of a treatment solution.

In the aspects of the invention that provide a composition comprising on average the polymerization reaction product of 2 moles of ethylamine, n moles of hydrogen sulfide, and n+1 moles of an aldehyde, in which n can be in the range of about 1 to about 12, the aldehyde may be formed from an aldehyde and/or aldehyde releaser. Aldehydes and aldehyde releasers, and preferences therefor, are as described above. In some aspects of this composition, n is in the range of about 3 to about 10, while in other aspects, n is in the range of about 7 to about 9.

In one aspect, ethylamine is believed to form a bi-terminated, telechelic oligomer, as shown in Diagram 1, unique in being both liquid and insoluble in an alkaline, aqueous scavenging solution. This novel oligomer composition, with average DP up to at least 9, and an average MW up to at least 517 Daltons, is useful because these reacted hydrogen sulfide products (ethylamine-terminated alkenyl sulfide oligomers) can be removed from the scavenger solution containing unreacted aldehyde and/or aldehyde releaser by gravity phase separation, leaving little or no sticky (adhesive), solid sulfide polymer behind in the scavenger solution containing unreacted aldehyde and/or aldehyde releaser, because the oligomers are liquids that are denser than, and immiscible with, the scavenger solution containing unreacted aldehyde and/or aldehyde releaser.

EXPERIMENTAL

In a sense of experiments, a "66-72" % (assumed 69%) active aqueous solution of ethylamine (EtNH2) was added to formalin, a 37% active aqueous solution of formaldehyde (HCHO) stabilized with "10-15" % (assumed 12.5%) methanol (MeOH), in various amounts. Additional water, MeOH, or isopropyl alcohol (IPA) were added as solvents to form a scavenging solution. These scavenging solutions each were sparged with a sour gas comprising 15% hydrogen sulfide (H2S) with 3% carbon dioxide (CO2) in methane (CH4) until free H2S broke through, indicating the scavenging solution was spent (the scavenger had been depleted). The solutions were allowed to stand until the polymerization reaction was complete and the polymer had separated from the spent scavenging solution. The phase of the precipitate (liquid and/or solid) and the fraction of solids in the precipitate was recorded.

Table IA below lists the materials added in each sample by weight, Table IB below lists the solution compositions by weight, and Table IC below lists the molar composition of the ethylamine-terminated alkenyl sulfide oligomers and polymers in the spent scavenging solution in terms of EtNH2, HCHO, degree of polymerization (DP) of the poly (methylene sulfide), i.e. the "n" in Diagram 1, and the molecular weight (MW) of the ethylamine bi-terminated poly(methylene sulfide), as shown in Diagram 1. For each composition (sample). Table IC lists the phase of the product polymer (liquid and/or solid) and the fraction of solids in the product polymer. The fraction of solids in the product polymer was determined by weighing after decanting to separate the liquid portion of the polymer to determine the weight of solid portion of the polymer as a weight percentage relative to total weight of the polymer.

TABLE 1A

| | Materials added | | | | |
|---|---|---|---|---|---|
| Sample | 37% H₂CO, wt¾ | 69% EtNH₂, wt¾ | Water, wt¾ | MeOH, wt¾ | IPA, wt¾ |
| 1 | 67.00 | 26.00 | 7.00 | — | — |
| 2* | 50.00 | — | 33.00 | — | — |
| 3 | 50.00 | 7.50 | 25.50 | — | — |
| 4 | 50.00 | 10.00 | 23.00 | — | — |
| 5 | 50.00 | 12.50 | 20.50 | — | — |
| 6 | 50.00 | 15.00 | 18.00 | — | — |
| 7 | 50.00 | 17.50 | 15.50 | — | — |
| 8 | 50.00 | 20.00 | 13.00 | — | — |
| 9 | 50.00 | 22.50 | 10.50 | — | — |
| 10* | 25.00 | — | 50.00 | — | — |
| 11 | 25.00 | 3.75 | 46.25 | — | — |
| 12 | 25.00 | 5.00 | 45.00 | — | — |
| 13 | 25.00 | 6.25 | 43.75 | — | — |
| 14* | 50.00 | — | — | 50.00 | — |
| 15 | 50.00 | 7.50 | — | 42.50 | — |
| 16 | 50.00 | 10.00 | — | 40.00 | — |
| 17 | 40.00 | 10.00 | — | 50.00 | — |
| 18 | 32.00 | 8.00 | — | 60.00 | — |
| 19 | 24.00 | 6.00 | — | 70.00 | — |
| 20 | 16.00 | 4.00 | — | 80.00 | — |
| 21 | 8.00 | 2.00 | — | 90.00 | — |
| 22 | 40.00 | 10.00 | — | — | 50.00 |
| 23 | 32.00 | 8.00 | — | — | 60.00 |
| 24 | 24.00 | 6.00 | — | — | 70.00 |
| 25 | 16.00 | 4.00 | — | — | 80.00 |
| 26 | 8.00 | 2.00 | — | — | 90.00 |

*Comparative sample.

TABLE 1B

| | Solution compositions | | | | | |
|---|---|---|---|---|---|---|
| Sample | H2CO, wt¾ | EtNH2, wt¾ | mol. ratio EtNH2 to H2CO | Water, wt¾ | MeOH, wt¾ | IPA, wt¾ |
| 1 | 24.79 | 17.94 | 0.48:1 | 48.90 | 8.38 | — |
| 2* | 18.50 | — | — | 58.25 | 6.25 | — |
| 3 | 18.50 | 5.18 | 0.187:1 | 53.08 | 6.25 | — |
| 4 | 18.50 | 6.90 | 0.249:1 | 51.35 | 6.25 | — |
| 5 | 18.50 | 8.63 | 0.311:1 | 49.63 | 6.25 | — |
| 6 | 18.50 | 10.35 | 0.373:1 | 47.90 | 6.25 | — |
| 7 | 18.50 | 12.08 | 0.435:1 | 46.18 | 6.25 | — |
| 8 | 18.50 | 13.80 | 0.497:1 | 44.45 | 6.25 | — |
| 9 | 18.50 | 15.53 | 0.560:1 | 42.73 | 6.25 | — |
| 10* | 9.25 | — | — | 62.63 | 3.13 | — |
| 11 | 9.25 | 2.59 | 0.187:1 | 60.04 | 3.13 | — |
| 12 | 9.25 | 3.45 | 0.249:1 | 59.18 | 3.13 | — |
| 13 | 9.25 | 4.31 | 0.311:1 | 5831 | 3.13 | — |
| 14* | 18.50 | — | — | 25.25 | 56.25 | — |
| 15 | 18.50 | 5.18 | 0.187:1 | 27.58 | 48.35 | — |
| 16 | 18.50 | 6.90 | 0.249:1 | 28.35 | 46.25 | — |
| 17 | 14.80 | 6.90 | 0.311:1 | 23.30 | 55.00 | — |
| 18 | 11.84 | 5.52 | 0.311:1 | 18.64 | 64.00 | — |
| 19 | 8.88 | 4.14 | 0.311:1 | 13.98 | 73.00 | — |
| 20 | 5.92 | 2.76 | 0.311:1 | 9.32 | 82.00 | — |
| 21 | 2.96 | 1.38 | 0.311:1 | 4.66 | 91.00 | — |
| 22 | 14.80 | 6.90 | 0.311:1 | 23.30 | 5.00 | 50.00 |
| 23 | 11.84 | 5.52 | 0.311:1 | 18.64 | 4.00 | 60.00 |
| 24 | 8.88 | 4.14 | 0.311:1 | 13.98 | 3.00 | 70.00 |
| 25 | 5.92 | 2.76 | 0.311:1 | 9.32 | 2.00 | 80.00 |
| 26 | 2.96 | 1.38 | 0.311:1 | 4.66 | 1.00 | 90.00 |

*Comparative sample.

TABLE 1C

| | Poly(methylene sulfide) in spent scavenging solutions | | | | | Results | |
| | | | | | | | Polymer solids, wt¾ |
| Sample | H2CO, moles | EtNH2, moles | EtNH2/ H2CO, mol | Deg. polym. (DP) | Polymer MW, Da | Polymer phase | |
|---|---|---|---|---|---|---|---|
| 1 | 0.826 | 0.398 | 0.48 | 3.1 | 247 | Liquid | — |
| 2* | 0.616 | — | — | >10 | >600 | Solid | 100.0 |
| 3 | 0.616 | 0.115 | 0.19 | 9.7 | 551 | Liq/ Solid | 25.0 |
| 4 | 0.616 | 0.153 | 0.25 | 7.1 | 427 | Liq/ Solid | 3.0 |
| 5 | 0.616 | 0.191 | 0.31 | 5.4 | 353 | Liquid | — |
| 6 | 0.616 | 0.230 | 0.37 | 4.4 | 303 | Liquid | — |
| 7 | 0.616 | 0.268 | 0.43 | 3.6 | 268 | Liquid | — |
| 8 | 0.616 | 0.306 | 0.50 | 3.0 | 242 | Liquid | — |
| 9 | 0.616 | 0.344 | 0.56 | 2.6 | 221 | Liquid | — |
| 10* | 0.308 | — | — | >10 | >600 | Solid | 100.0 |
| 11 | 0.308 | 0.057 | 0.19 | 9.7 | 551 | Liq/ Solid | 50.0 |
| 12 | 0.308 | 0.077 | 0.25 | 7.1 | 427 | Liquid | — |
| 13 | 0.308 | 0.096 | 0.31 | 5.4 | 353 | Liquid | — |
| 14* | 0.616 | — | — | >10 | >600 | Solid | 100.0 |
| 15 | 0.616 | 0.115 | 0.19 | 9.7 | 551 | Liq/ Solid | 7.5 |
| 16 | 0.616 | 0.153 | 0.25 | 7.1 | 427 | Liquid | — |
| 17 | 0.493 | 0.153 | 0.31 | 5.4 | 353 | Liquid | — |
| 18 | 0.394 | 0.122 | 0.31 | 5.4 | 353 | Liquid | — |
| 19 | 0.296 | 0.092 | 0.31 | 5.4 | 353 | Liquid | — |
| 20 | 0.197 | 0.061 | 0.31 | 5.4 | 353 | Liquid | — |
| 21 | 0.099 | 0.031 | 0.31 | 5.4 | 353 | No phase sep.² | — |
| 22 | 0.493 | 0.153 | 0.31 | 5.4 | 353 | Liquid | — |
| 23 | 0.394 | 0.122 | 0.31 | 5.4 | 353 | Liquid | — |
| 24 | 0.296 | 0.092 | 0.31 | 5.4 | 353 | Liquid | — |
| 25 | 0.197 | 0.061 | 0.31 | 5.4 | 353 | No phase sep.² | — |
| 26 | 0.099 | 0.031 | 0.31 | 5.4 | 353 | No phase sep.² | — |

¹ Comparative sample.
² "No phase sep." means that no phase separation, either liquid-liquid or liquid-solid, was observed.

As can be discerned from Table 1C, with no ethylamine added to the formaldehyde, 100% of the precipitated polymer was solid (samples 2, 10, 14). Using 67% formalin (24.8% HCHO), at least 26.0% ethylamine solution (17.9/6 EtNH2) was needed to render the precipitate completely liquid (sample 1). This is a EtNH2/HCHO molar ratio of 0.48, a DP of 3.1, a MW of 247 Daltons. Using 50% formalin (18.5% HCHO), at least 12.5% ethylamine solution (8.63% EtNH2) was needed to render the precipitate completely liquid (samples 5-9). This is a EtNH2/HCHO molar ratio of 0.31, a DP of 5.4, a MW of 353 Daltons. Using 25% formalin (9.25% HCHO), at least 5.0% ethylamine solution (3.45% EtNH2) was needed to render the precipitate completely liquid (samples 12-13). This is a EtNH2/HCHO molar ratio of 0.25, a DP of 7.1, a MW of 427 Daltons. The minimum effective mole ratio of inhibitor needed to eliminate solids thus decreases with decreasing amounts of formaldehyde, and thus polymer, concentration. The relationship, shown in Graph 1 in FIG. 2, implies the minimum effective inhibitor (MEI) mole ratio for zero solids under total spent conditions plateaus at about 0.25 for formaldehyde.

If an additional 40% or so MeOH, beyond that natively in (present in the original solution with) the formalin, is added to the scavenging solution, however, the MEI ratio for zero solids can be brought down further (samples 15-16, compared to samples 3-4). The relationship, shown in Graph 2 in FIG. 2, implies the MET ratio for zero solids with around 50% total MeOH is about 0.20, a DP of 9.0, a MW of 517 Daltons.

Notably, however, excessive amounts of MeOH, such as 90% or greater, or lesser amounts of higher alcohols such as IPA at 80% or greater, can solubilize the bi-terminated polymer in the spent scavenging solution (samples 21, 25-26), which is to be minimized or avoided in processes where the liquid bi-terminated polymer is to be separated from the spent scavenging solution, as described below.

In some embodiments of the scavenging compositions, alcohols instead of or in addition to methanol or isopropyl alcohol are present. These alcohols include monoalcohols, diols, and polyols having one to about six carbon atoms; a preferred alcohol is ethanol.

In the formation of some of the preferred scavenging compositions, ethylamine may be in the form of an aqueous solution containing about 30 wt % or more ethylamine; more preferred are aqueous solutions of 66 to 72% ethylamine by weight; especially preferred are aqueous solutions of ethylamine in which the only components are ethylamine and water. In the formation of some of the preferred scavenging compositions in which the aldehyde is formaldehyde, formaldehyde may be in the form of an aqueous solution containing about 15 wt % or more formaldehyde; more preferred are aqueous solutions of 37% formaldehyde by weight; especially preferred are aqueous solutions of formaldehyde in which the only components are formaldehyde and water.

In some embodiments of the scavenging compositions, the molar ratio of ethylamine to aldehyde from the aldehyde and/or aldehyde releaser is about 0.87 to about 0.8, preferably about 0.187 to about 0.7; more preferably, the aldehyde is formaldehyde.

In another series of experiments, a 66-72% (assumed 69%) active aqueous solution of ethylamine (EtNH2) was added to formalin, a 37% active aqueous solution of formaldehyde (HCHO) stabilized with 10-15% (assumed 12.5%) methanol (MeOH), in various amounts. Additional water or MeOH were added as solvents to form scavenging solutions. These scavenging solutions each were subjected to various tests.

Capacity test (efficacy test). In this test, for each sample, about 20 grams of the scavenger solution were introduced into a tall glass tower and a downcomer equipped with a micron-sized frit was connected to the tall glass tower. A sour gas comprising 15% hydrogen sulfide (H2S), 3% carbon dioxide (CO2), and 82% methane (CH4) was sparged through the scavenger solution at a rate of 100 mL/min and H2S was measured at the outlet of the tall glass scrubbing tower with a H2S detector. A sample passed the test if the amount of H2S remained below 4000 ppm for at least 60 minutes, and a sample failed the test if the amount of H2S remained below 4000 ppm before 60 minutes had passed. For samples that failed this test, the time elapsed to reach 4000 ppm H2S was recorded.

Total spend—solids test. In this test, for each sample, about 10 grams of the scavenger solution were put into a 50 mL plastic container connected to a downcomer by a polymeric (plastic) gas line. A sour gas comprising 15% H2S, 3% CO2, and 82% CH4 was sparged into the scavenger solution at a rate of 500 mL/min. for 60 minutes. After the sparging (spending) period, each sample was observed for at least 1 week; most samples were observed for 4 weeks. Absence of solids in the sample upon visual inspection passes this test; presence of solids in the sample fails this test.

Kinetics test. In this test, for each sample, about 10 grams of the scavenger solution were introduced into a tall glass tower and an open-ended glass downcomer equipped with a micron-sized frit was connected to the tall glass tower. The contact space between the downcomer and top of scavenger solution level was less than 1 inch (2.5 cm). A feed of sour gas comprising 15% H2S, 3% CO2, and 82% CH4 was started at a rate of 50 mL/min. After 2 minutes, the H2S was measured, and then the sour gas flow rate was increased by an increment of 50 mL/min. and re-tested after 2 minutes, repeating until the amount of H2S reached 500 ppm. When necessary, after 2 cycles of this test, the scavenger solution was replaced with fresh scavenger solution of the same composition and the initial flow rate started at the same rate at which the used scavenger solution of the same composition ended, to test reaction kinetics and not capacity. A flow rate greater than 100 mL/min. passes this test; a flow rate of 100 mL/min. or less fails this test.

CO2 Slip test. In this test, for each sample, about 20 grams of the scavenger solution were introduced into a tall glass tower and a downcomer equipped with a micron-sized frit was connected to the tall glass tower. A gas comprising 15% CO2, and 85% CH4 was sparged through the scavenger solution at a rate of 100 mL/min for 30 minutes and CO2 was measured at the outlet of the tall glass scrubbing tower with a CO2 detector. If any CO2 scavenging was detected, the sample failed the test; if no CO2 scavenging was detected, the sample passed the test.

Direct Injection test. In this test, for each sample, about 200 grams of the scavenger solution were introduced into a bottle equipped with a micron-size spray nozzle and heated to 120° F. (49° C.). The scavenger solution was then sprayed onto the interior surface of a vertical coned funnel under a vent hood to facilitate evaporation of volatile components. This process of heating and spraying was repeated twice for each sample, after which the scavenging solution was weighed. The sample failed the test if the weight loss was greater than 20%, the sample passed the test if the weight loss was 20s or less.

Aging test. In this test, for each sample, about 100 grams of scavenging solution were introduced into in a prescription bottle, which bottle was placed into a temperature cycling chamber. The temperature cycling chamber cycled in a temperature range from 130° F. to 80° F. (54.4° C. to 26.7° C.) every 12 hours. After 30 days of temperature cycling, the scavenger solution sample was removed and subjected to the capacity, total spend—solids, kinetics, CO2 slip, and direct injection tests. A sample that did not perform as well on the other tests as a sample scavenger solution of the same composition that had not been subjected to the aging test failed the aging test. A sample that performed in a comparable manner to a sample scavenger solution of the same composition that had not been subjected to the aging test passed the aging test.

Table 2 below lists the molar ratios of ethylamine to formaldehyde in each sample group, and summarizes the results of various tests performed in each group. Results were consistent across all of the samples within a Group.

TABLE 2

| Group | Mol. ratio EtNH2 to H2CO | Capacity | Total spend-solids | Kinetics | CO2 slip | Direct inject | Aging | Number of samples |
|---|---|---|---|---|---|---|---|---|
| A* | 0.013:1 | pass | fail | fail | pass | fail | fail | 28 |
| B* | 0.1:1 | pass | fail | fail | pass | fail | fail | 100 to 500 |
| C | 0.2:1 | pass | pass | pass | pass | pass | pass | 100 to 500 |
| D | 0.5:1 | pass | pass | pass | pass | pass | pass | 100 to 500 |
| E | 0.75:1 | pass | pass | pass | pass | pass | pass | 100 to 500 |
| F | 0.9:1 | pass | pass | pass | pass | pass | pass | 100 to 500 |
| G* | 1:1 | fail | pass | pass | pass | pass | pass | 100 to 500 |
| H* | 1.7:1 | fail | pass | pass | fail | fail | fail | 100 to 500 |
| I* | 2:1 | fail | pass | pass | fail | fail | fail | 28 |

*All runs in this Group are comparative.

In various embodiments, the oligomer Et(H)N—[C(H)(R)S]n-C(H)(R)—N(H)Et formed in the reaction depicted in Diagram 1 comprises a liquid composition that is immiscible in the remaining chemical mixture (spent scavenging solution comprising unreacted components EtNH2 and/or R——=O). In one aspect, the oligomer, Et(H)N—[C(H)(R)S]n-C(H)(R)—N(H)Et, may be separated from the scavenging solution containing unreacted scavenger by gravity separation.

Diagram 2, shown in FIG. 1, depicts an embodiment of a reaction between the immiscible liquid oligomer Et(H)N—[C(H)(R)S]n-C(H)(R)—N(H)Et with sodium hydroxide (NaOH). As shown in Diagram 2, the alkali hydrolysis of an oligomer Et(H)N—[C(H)(R)S]n-C(H)(R)—N(H)Et produces two equivalents of ethylamine, "n" equivalents of hydroxy sulfide salt [HOC(H)(R)S-Na+], and one equivalent of hydroxy oxide salt HOC(H)(R)O— Na+. Although the alkali hydrolysis described in Diagram 2 utilizes NaOH as the basic reactant, the invention is not limited thereto, and other alkaline reagents, including but not limited to, potassium hydroxide (KOH), may be employed, as would be understood by one skilled in the art.

Another feature of at least some embodiments of this invention further comprises separating, preferably by gravity, the more dense, immiscible, free-flowing, liquid reaction product from the unreacted aldehyde and/or aldehyde releaser in the scavenging solution, and recovering from it the ethylamine via alkaline hydrolysis with, for example, sodium hydroxide (NaOH) or potassium hydroxide (KOH). The reaction is shown in Diagram 2 in FIG. 1. The liberated ethylamine may then be recovered via distillation (boiling point 62° F., or 16.7° C.) or extraction into organic solvent (Po1w=0), and optionally recycled back into the system, for example, by condensation or sparging. An exemplary embodiment of this process is shown in FIG. 3.

In one aspect, ethylamine serves to both catalyze the sulfide-aldehyde reaction (by forming the reactive nucleophile, HS-anion) and to inhibit the polymerization of the reaction (presumably by rapidly terminating both ends of the chain), and the ethylamine can then be recovered from the polymer, with the net result that the ethylamine is not consumed in the process. In operation, this presents a considerable cost savings and prevents the amine from contaminating wastewater.

Figure 3:
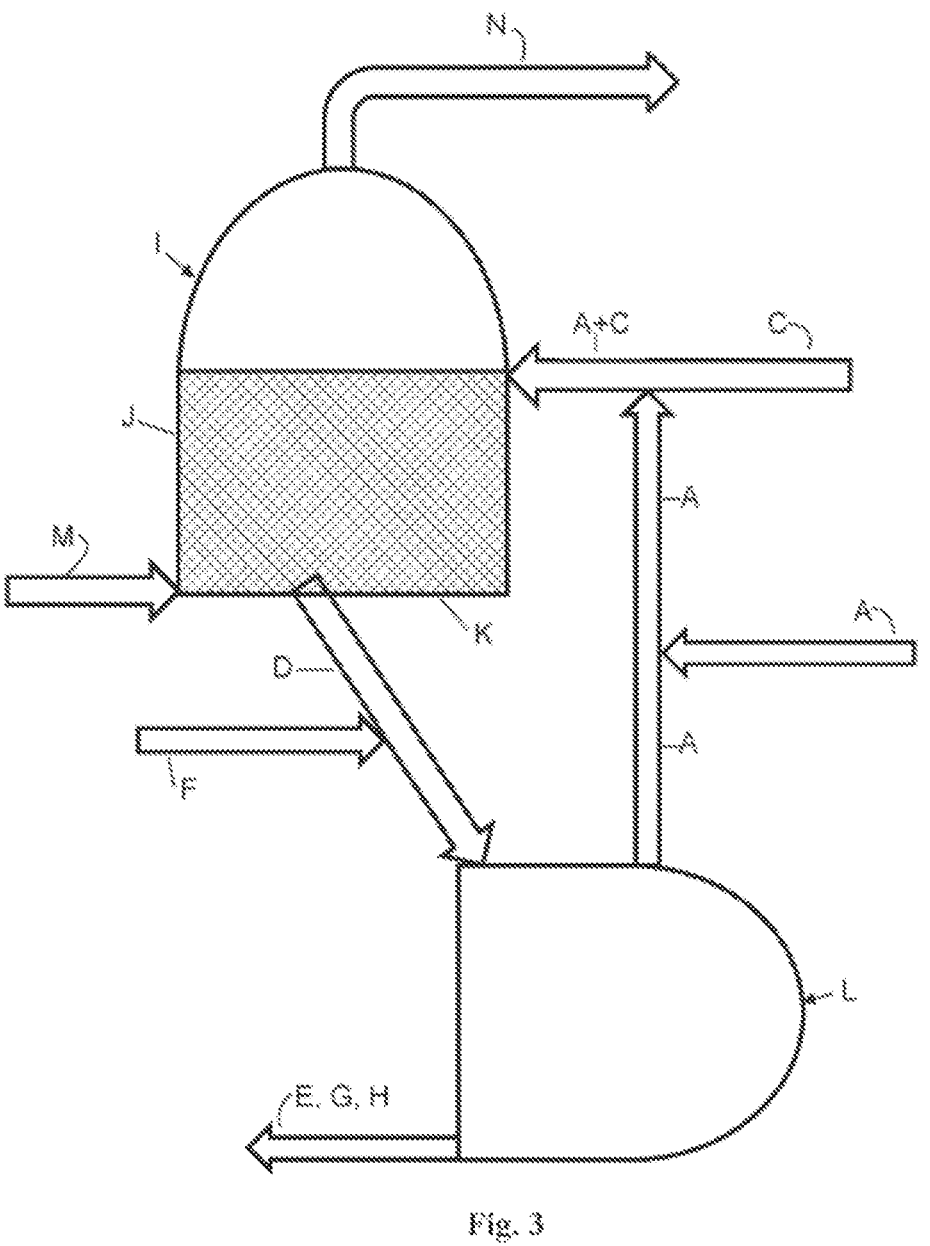
FIG. 3 is a schematic diagram illustrating one embodiment of an inhibitor recycling process of the present invention.

FIG. 3 shows one embodiment of a process which includes inhibitor recycling. In this embodiment, a sour stream (labeled M) enters a scrubber (labeled 1) through a fluid distributor (labeled K). The ethylamine A is introduced into aldehyde solution C and the combined ethylamine and aldehyde solution A+C enters the scrubber I above a fluid entry point (not separately labeled) and scrubber I passes the ethylamine and aldehyde solution through a scavenger distributor (labeled J) located within scrubber I into contact with the sour stream; in some embodiments, the scrubber is a liquid-liquid separator. The denser immiscible liquid oligomer D phase separates to the bottom of the scrubber I from where it is pumped or drained into a liquid-gas separator (labeled L). Alkali F may be added to the liquid-gas separator L to mix with the oligomer liquid oligomer D, or preferably, alkali F is added to the stream of the liquid oligomer D before introduction into the liquid-gas separator L, as shown in FIG. 3 The ethylamine A gas liberated is separated from the liquid by distillation and dissolved into to the aldehyde solution C, by condensation or sparging. The ethylamine-aldehyde solution (A+C) then enters the scrubber I, as described above. The scavenged sweet stream (labeled N) exits the top of the scrubber I. The hydrolyzed monomers G. Hand water E exit the bottom of the liquid-gas separator L.

With reference to FIG. 3, in another embodiment (not shown in FIG. 3), the combined ethylamine A and aldehyde solution C is added directly to the sour stream Min line ahead of a concurrent flow contactor which spills over to a scrubber 1 so that the mixture of the sour stream, ethylamine, and aldehyde and/or the reaction products thereof enter at a point to optimize separation.

The subject matter is described above with reference to numerous aspects and specific examples. Many variations will suggest themselves to those skilled in the art in light of the above detailed description. All such obvious variations are within the full intended scope of the appended claims. Other aspects of the subject matter disclosed herein can include, but are not limited to, the following aspects, which are described as comprising, but, alternatively, can consist essentially of, or consist of:

Aspect 1. A method of inhibiting the polymerization of an aldehyde and hydrogen sulfide to minimize solids formation by using ethylamine.

Aspect 2. The method of Aspect 1 in which the aldehyde is formaldehyde.

Aspect 3. The method of Aspect 1 using less than one half mole of ethylamine per mole of aldehyde.

Aspect 4. The method of Aspect 3 using less than one quarter mole of ethylamine per mole of aldehyde.

Aspect 5. The method of Aspect 4 using less than one fifth mole of ethylamine per mole of aldehyde in a solution comprising from 40% to 80% methanol.

Aspect 6. A method of scavenging hydrogen sulfide from a stream containing an undesirable amount of hydrogen sulfide with an aldehyde without forming solids using ethylamine in which the reaction product forms a denser, immiscible, liquid phase which is separated and removed by gravity from the scavenging medium.

Aspect 7. The method of Aspect 6 in with the aldehyde is formaldehyde.

Aspect 8. The method of Aspect 6 using less than one half mole of ethylamine per mole of aldehyde.

Aspect 9. The method of Aspect 8 using less than one quarter mole of ethylamine per mole of aldehyde.

Aspect 10. The method of Aspect 9 using less than one fifth mole of ethylamine per mole of aldehyde in a solution comprising from 40% to 80% methanol.

Aspect 11. The method of Aspect 6 in which the removed liquid reaction product phase is hydrolyzed with alkali to recover the ethylamine.

Aspect 12. The method of Aspect 11 in which the recovered ethylamine is recycled to a stream containing an undesirable amount of hydrogen sulfide or into a stream forming a treatment solution.

Aspect 13. A composition of inhibited polymers comprising on average the reaction product of 2 moles of ethylamine, n moles of hydrogen sulfide, and n+1 moles of an aldehyde, RCHO, where R can be hydrogen, alkyl, alkenyl, aryl, or carbonyl, and n can be from about 1 to about 12.

Aspect 14. The composition of Aspect 13 in which the aldehyde is formaldehyde.

Aspect 15. The composition of Aspect 13 in which n can be from about 3 to about 10.

Aspect 16. The composition of Aspect 13 in which n can be from about 7 to about 9.

Aspect 17. A composition formed from ingredients comprising an aldehyde and ethylamine, wherein there is less than one molar equivalent of ethylamine in relation to the amount of aldehyde, and wherein the composition further comprises a) from about 40% to about 80% methanol by weight relative to the total weight of the composition, or b) isopropyl alcohol, optionally wherein the amount of isopropyl alcohol is from about 50% to 90% by weight relative to the total weight of the composition.

Aspect 18. A method for preparing a composition, which method comprises combining ethylamine and an aldehyde, wherein there is less than one molar equivalent of ethylamine in relation to the amount of aldehyde, further comprising adding from about 40% to about 80% methanol by weight relative to the total weight of the composition formed, or further comprising adding from about 50% to 90% isopropyl alcohol by weight relative to the total weight of the composition formed.

Aspect 19. A method for scavenging hydrogen sulfide by contacting a stream containing an undesirable amount of hydrogen sulfide with an aldehyde and ethylamine to form a treated stream, wherein there is less than one molar equivalent of ethylamine in relation to the amount of aldehyde, and allowing the treated stream to form a treated stream and a spent scavenger solution phase comprising ethylamine-terminated alkenyl sulfide oligomers and/or polymers, and further comprising hydrolyzing the ethylamine-terminated alkenyl sulfide oligomers and/or polymers with alkali to release ethylamine and optionally recovering therefrom at least a portion of the ethylamine.

Aspect 20. A method for scavenging hydrogen sulfide by contacting a stream containing an undesirable amount of hydrogen sulfide with an aldehyde, characterized in that ethylamine is added to the stream containing an undesirable amount of hydrogen sulfide, further comprising adding from about 40% to about 80% methanol by weight relative to the total weight of the aldehyde solution, ethylamine solution, and methanol, or further comprising adding from about 50% to 90% by weight isopropyl alcohol relative to the total weight of the aldehyde solution, ethylamine solution, and isopropyl alcohol.

Aspect 21. A composition formed from ingredients comprising a) an aldehyde and/or an aldehyde releaser, and b) ethylamine, wherein there is less than one molar equivalent of ethylamine in relation to the total amount of aldehyde provided by a).

Aspect 22. The composition as in Aspect 21, wherein the aldehyde is selected from the group consisting of formaldehyde, benzaldehyde, furfural, acrolein, glutaraldehyde, glyoxal and any combination of two or more of the foregoing, with the proviso that when the aldehyde is formaldehyde, water is also present in the composition.

Aspect 23. The composition as in Aspect 21, wherein the aldehyde is formaldehyde, and the ingredients further comprise water.

Aspect 24. The composition as in Aspect 21, wherein the aldehyde releaser is formed from i) an aldehyde and ii) a primary or secondary amine, an alkanolamine, an alcohol or a combination of any two or more of the foregoing.

Aspect 25. The composition as in Aspect 24 wherein the aldehyde releaser is formed from i) an aldehyde and ii) methylamine, ethanolamine or ethanol.

Aspect 26. The composition as in Aspect 21, wherein there is about 0.2 or more molar equivalent of ethylamine per mole of aldehyde provided by a), and optionally wherein the aldehyde is formaldehyde and the ingredients further comprise water.

Aspect 27. The composition as in Aspect 21, wherein the molar ratio of ethylamine to the total amount of aldehyde provided by a) is about 0.2:1 to about 0.9:1; or wherein the molar ratio of ethylamine to the total amount of aldehyde provided by a) is about 0.2:1 to about 0.75:1, and optionally wherein the aldehyde is formaldehyde and the ingredients further comprise water.

Aspect 28. The composition as in Aspect 21, wherein
the amount of ethylamine is less than one half mole of ethylamine per mole of aldehyde provided by a); or
the amount of ethylamine is less than one quarter mole of ethylamine per mole of aldehyde provided by a); or
the amount of ethylamine is less than one fifth mole of ethylamine per mole of aldehyde provided by a); and
optionally wherein the aldehyde is formaldehyde and the ingredients further comprise water.

Aspect 29. The composition as in Aspect 21, wherein
the molar ratio of ethylamine to the total amount of aldehyde provided by a) is about 0.187 to about 0.56; or
the molar ratio of ethylamine to the total amount of aldehyde provided by a) is about 0.187 to about 0.495, or
the molar ratio of ethylamine to the total amount of aldehyde provided by a) is about 0.187 to about 0.48; or
the molar ratio of ethylamine to the total amount of aldehyde provided by a) is about 0.187 to about 0.435, or the molar ratio of ethylamine to the total amount of aldehyde provided by a) is about 0.187 to about 0.37; or the molar ratio of ethylamine to the total amount of aldehyde provided by a) is about 0.187 to about 0.31; or the molar ratio of ethylamine to the total amount of aldehyde provided by a) is about 0.249 to about 0.56; or the molar ratio of ethylamine to the total amount of aldehyde provided by a) is about 0.249 to about 0.497; or the molar ratio of ethylamine to the total amount of aldehyde provided by a) is about 0.249 to about 0.48; or the molar ratio of ethylamine to the total amount of aldehyde provided by a) is about 0.249 to about 0.435; or the molar ratio of ethylamine to the total amount of aldehyde provided by a) is about 0.249 to about 0.37; or the molar ratio of ethylamine to the total amount of aldehyde provided by a) is about 0.31 to about 0.37, and optionally wherein the aldehyde is formaldehyde and the ingredients further comprise water.

Aspect 30. The composition as in Aspect 21, wherein the ingredients further comprise water; or methanol and water, or isopropyl alcohol and water.

Aspect 31. A composition as in Aspect 21, formed from ingredients consisting essentially of a) an aldehyde and/or aldehyde releaser, b) ethylamine, and c) water, wherein there is less than one molar equivalent of ethylamine in relation to the total amount of aldehyde provided by a), or formed from ingredients consisting essentially of formaldehyde, ethylamine, methanol, and water, wherein there is less than one molar equivalent of ethylamine in relation to the amount of formaldehyde.

Aspect 32. A composition as in Aspect 21 formed from ingredients consisting of a) an aldehyde and/or aldehyde releaser, b) ethylamine, and c) water, wherein there is less than one molar equivalent of ethylamine in relation to the total amount of aldehyde provided by a), or formed from ingredients consisting of formaldehyde, ethylamine, methanol, and water, wherein there is less than one molar equivalent of ethylamine in relation to the amount of formaldehyde.

Aspect 33. A method for preparing a composition, which method comprises combining a) an aldehyde and/or an aldehyde releaser, and b) ethylamine, wherein there is less than one molar equivalent of ethylamine in relation to the total amount of aldehyde provided by a).

Aspect 34. The method as in Aspect 33, wherein the aldehyde is selected from the group comprising formaldehyde, benzaldehyde, furfural, acrolein, glutaraldehyde, glyoxal, and any combination of two or more of the foregoing, with the proviso that when the aldehyde is formaldehyde, water is also combined.

Aspect 35. The method as in Aspect 33, wherein the aldehyde is formaldehyde, and water is also combined.

Aspect 36. The method as in Aspect 33 further comprising combining with the ethylamine and the aldehyde: water; or methanol and water, or isopropyl alcohol and water.

Aspect 37. The method as in Aspect 33, wherein the aldehyde releaser is formed from i) an aldehyde and ii)

a primary or secondary amine, an alkanolamine, an alcohol, or any combination of two or more of the foregoing.

Aspect 38. The method as in Aspect 37, wherein the aldehyde releaser is formed from i) an aldehyde and ii) methylamine, ethanolamine or ethanol.

Aspect 39. The method as in Aspect 33, wherein there is about 0.2 or more molar equivalent of ethylamine per mole of aldehyde provided by a); and optionally wherein the aldehyde is formaldehyde and the ingredients further comprise water.

Aspect 40. The method as in Aspect 33, wherein the molar ratio of ethylamine to the total amount of aldehyde provided by a) is about 0.2:1 to about 0.9:1; or wherein the molar ratio of ethylamine to the total amount of aldehyde provided by a) is about 0.2:1 to about 0.75:1; and optionally wherein the aldehyde is formaldehyde and the ingredients further comprise water.

Aspect 41. The method as in Aspect 33, wherein the amount of ethylamine is less than one half mole of ethylamine per mole of aldehyde provided by a); or the amount of ethylamine is less than one quarter mole of ethylamine per mole of aldehyde provided by a); or the amount of ethylamine is less than one fifth mole of ethylamine per mole of aldehyde provided by a); and optionally wherein the aldehyde is formaldehyde and water is also combined.

Aspect 42. The method as in Aspect 33, wherein the molar ratio of ethylamine to the total amount of aldehyde provided by a) is about 0.187 to about 0.56, or the molar ratio of ethylamine to the total amount of aldehyde provided by a) is about 0.187 to about 0.495, or the molar ratio of ethylamine to the total amount of aldehyde provided by a) is about 0.187 to about 0.48; or the molar ratio of ethylamine to the total amount of aldehyde provided by a) is about 0.187 to about 0.435; or the molar ratio of ethylamine to the total amount of aldehyde provided by a) is about 0.187 to about 0.37; or the molar ratio of ethylamine to the total amount of aldehyde provided by a) is about 0.187 to about 0.31, or the molar ratio of ethylamine to the total amount of aldehyde provided by a) is about 0.249 to about 0.56; or the molar ratio of ethylamine to the total amount of aldehyde provided by a) is about 0.249 to about 0.497; or the molar ratio of ethylamine to the total amount of aldehyde provided by a) is about 0.249 to about 0.48; or the molar ratio of ethylamine to the total amount of aldehyde provided by a) is about 0.249 to about 0.435; or the molar ratio of ethylamine to the total amount of aldehyde provided by a) is about 0.249 to about 0.37, or the molar ratio of ethylamine to the total amount of aldehyde provided by a) is about 0.31 to about 0.37; and optionally wherein the aldehyde is formaldehyde and water is also combined.

Aspect 43. The method as in Aspect 33, wherein the ethylamine is in an aqueous solution, optionally wherein the aqueous solution of ethylamine is a 66% to 72% aqueous solution of ethylamine, and wherein the aldehyde and/or aldehyde releaser is in an aqueous solution, optionally wherein the aqueous solution of an aldehyde and/or aldehyde releaser is a 37% aqueous solution of formaldehyde.

Aspect 44. The method as in Aspect 43, wherein
the amount of ethylamine is less than one half mole of ethylamine per mole of aldehyde provided by a); or
the amount of ethylamine is less than one quarter mole of ethylamine per mole of aldehyde provided by a); or
the amount of ethylamine is less than one fifth mole of ethylamine per mole of aldehyde provided by a).

Aspect 45. The method as in Aspect 43, wherein
the molar ratio of ethylamine to the total amount of aldehyde provided by a) is about 0.187 to about 0.56; or
the molar ratio of ethylamine to the total amount of aldehyde provided by a) is about 0.187 to about 0.495; or
the molar ratio of ethylamine to the total amount of aldehyde provided by a) is about 0.187 to about 0.48, or
the molar ratio of ethylamine to the total amount of aldehyde provided by a) is about 0.187 to about 0.435; or
the molar ratio of ethylamine to the total amount of aldehyde provided by a) is about 0.187 to about 0.37; or
the molar ratio of ethylamine to the total amount of aldehyde provided by a) is about 0.187 to about 0.31; or
the molar ratio of ethylamine to the total amount of aldehyde provided by a) is about 0.249 to about 0.56; or
the molar ratio of ethylamine to the total amount of aldehyde provided by a) is about 0.249 to about 0.497; or
the molar ratio of ethylamine to the total amount of aldehyde provided by a) is about 0.249 to about 0.48; or
the molar ratio of ethylamine to the total amount of aldehyde provided by a) is about 0.249 to about 0.435; or
the molar ratio of ethylamine to the total amount of aldehyde provided by a) is about 0.249 to about 0.37, or
the molar ratio of ethylamine to the total amount of aldehyde provided by a) is about 0.31 to about 0.37.

Aspect 46. A method for scavenging hydrogen sulfide, which method comprises.
contacting a stream containing an undesirable amount of hydrogen sulfide with a treatment solution, the treatment solution formed from ingredients comprised of a) an aldehyde and/or aldehyde releaser and b) ethylamine, to form a treated stream and a spent scavenger solution phase comprising ethylamine-terminated alkenyl sulfide oligomers and/or polymers,
wherein less than one molar equivalent of ethylamine in relation to the total amount of aldehyde provided by a) is used to form the treatment solution.

Aspect 47. The method as in Aspect 46 further comprising separating the ethylamine-terminated alkenyl sulfide oligomers and/or polymers from the spent scavenger solution phase.

Aspect 48. The method of Aspect 47 further comprising hydrolyzing the ethylamine-terminated alkenyl sulfide oligomers and/or polymers with alkali to release ethylamine and optionally recovering therefrom at least a portion of the ethylamine.

Aspect 49. The method of Aspect 48, wherein at least a portion of the ethylamine is recovered, and the method further comprises recycling the recovered ethylamine to a stream containing an undesirable amount of hydrogen sulfide or to be part of a treatment solution.

Aspect 50. The method as in Aspect 46, wherein the aldehyde is selected from the group comprising formaldehyde, benzaldehyde, furfural, acrolein, glutaraldehyde, glyoxal, and any combination of two or more of the foregoing, with the proviso that when the aldehyde is formaldehyde, water is also present in the treatment solution.

Aspect 51. The method as in Aspect 46, wherein the aldehyde is formaldehyde, and water is also present in the treatment solution.

Aspect 52. The method as in Aspect 46, wherein the aldehyde releaser is formed from i) an aldehyde and ii) a primary or secondary amine, an alkanolamine, an alcohol, or any combination of two or more of the foregoing.

Aspect 53. The method as in Aspect 52, wherein the aldehyde releaser is formed from i) an aldehyde and ii) methylamine, ethanolamine or ethanol.

Aspect 54. The method as in Aspect 46, wherein there is about 0.2 or more molar equivalent of ethylamine per mole of aldehyde provided by a), and optionally wherein the aldehyde is formaldehyde and the ingredients further comprise water.

Aspect 55. The method as in Aspect 46, wherein the molar ratio of ethylamine to the total amount of aldehyde provided by a) is about 0.2:1 to about 0.9:1; or wherein the molar ratio of ethylamine to the total amount of aldehyde provided by a) is about 0.2:1 to about 0.75:1; and optionally wherein the aldehyde is formaldehyde and the ingredients further comprise water.

Aspect 56. The method as in Aspect 46, wherein
the amount of ethylamine is less than one half mole of ethylamine per mole of aldehyde provided by a); or
the amount of ethylamine is less than one quarter mole of ethylamine per mole of aldehyde provided by a); or
the amount of ethylamine is less than one fifth mole of ethylamine per mole of aldehyde provided by a); and
optionally wherein the aldehyde is formaldehyde and water is also present in the treatment solution.

Aspect 57. The method as in Aspect 46, wherein
the molar ratio of ethylamine to the total amount of aldehyde provided by a) is about 0.187 to about 0.56; or
the molar ratio of ethylamine to the total amount of aldehyde provided by a) is about 0.187 to about 0.495; or
the molar ratio of ethylamine to the total amount of aldehyde provided by a) is about 0.187 to about 0.48; or
the molar ratio of ethylamine to the total amount of aldehyde provided by a) is about 0.187 to about 0.435; or the molar ratio of ethylamine to the total amount of aldehyde provided by a) is about 0.187 to about 0.37; or the molar ratio of ethylamine to the total amount of aldehyde provided by a) is about 0.187 to about 0.31; or the molar ratio of ethylamine to the total amount of aldehyde provided by a) is about 0.249 to about 0.56, or the molar ratio of ethylamine to the total amount of aldehyde provided by a) is about 0.249 to about 0.497; or the molar ratio of ethylamine to the total amount of aldehyde provided by a) is about 0.249 to about 0.48; or the molar ratio of ethylamine to the total amount of aldehyde provided by a) is about 0.249 to about 0.435; or the molar ratio of ethylamine to the total amount of aldehyde provided by a) is about 0.249 to about 0.37; or the molar ratio of ethylamine to the total amount of aldehyde provided by a) is about 0.31 to about 0.37; and optionally wherein the aldehyde is formaldehyde and water is also present in the treatment solution.

Aspect 58. The method as in Aspect 46, wherein the spent scavenger solution phase has a reduced amount of solids formation as compared to that phase formed using same method but carried out in the absence of ethylamine.

Aspect 59. A method for scavenging hydrogen sulfide by a process comprising.

contacting a stream containing an undesirable amount of hydrogen sulfide with a solution comprised of a) an aldehyde and/or aldehyde releaser to form a treated stream and a spent scavenger solution phase, characterized in that ethylamine is added to the stream containing an undesirable amount of hydrogen sulfide, and the spent scavenger solution phase comprises ethylamine-terminated alkenyl sulfide oligomers and/or polymers, wherein there is less than one molar equivalent of ethylamine in relation to the amount of aldehyde provided by a) to the stream containing an undesirable amount of hydrogen sulfide.

Aspect 60. The method as in Aspect 59 further comprising separating the ethylamine-terminated alkenyl sulfide oligomers and/or polymers from the spent scavenger solution phase.

Aspect 61. The method as in Aspect 59, wherein the aldehyde is selected from the group comprising formaldehyde, benzaldehyde, furfural, acrolein, glutaraldehyde, glyoxal, and any combination of two or more of the foregoing, with the proviso that when the aldehyde is formaldehyde, water is also present in the solution.

Aspect 62. The method as in Aspect 59, wherein the aldehyde is formaldehyde, and water is also present in the solution.

Aspect 63. The method as in Aspect 59, wherein the aldehyde releaser is formed from i) an aldehyde and ii) a primary or secondary amine, an alkanolamine, an alcohol, or any combination of two or more of the foregoing.

Aspect 64. The method as in Aspect 59, wherein the aldehyde releaser is formed from i) an aldehyde and ii) methylamine, ethanolamine or ethanol.

Aspect 65. The method as in Aspect 59, wherein there is about 0.2 or more molar equivalent of ethylamine per mole of aldehyde provided by a); and optionally wherein the aldehyde is formaldehyde and the ingredients further comprise water.

Aspect 66. The method as in Aspect 59, wherein the molar ratio of ethylamine to the total amount of aldehyde provided by a) is about 0.2:1 to about 0.9:1; or wherein the molar ratio of ethylamine to the total amount of aldehyde provided by a) is about 0.2.1 to about 0.75:1; and optionally wherein the aldehyde is formaldehyde and the ingredients further comprise water.

Aspect 67. The method as in Aspect 59, wherein
the amount of ethylamine is less than one half mole of ethylamine per mole of aldehyde provided by a); or
the amount of ethylamine is less than one quarter mole of ethylamine per mole of aldehyde provided by a); or
the amount of ethylamine is less than one fifth mole of ethylamine per mole of aldehyde provided by a); and
optionally wherein the aldehyde is formaldehyde and water is also present in the solution.

Aspect 68. The method as in Aspect 59, wherein
the molar ratio of ethylamine to the total amount of aldehyde provided by a) is about 0.187 to about 0.56; or
the molar ratio of ethylamine to the total amount of aldehyde provided by a) is about 0.187 to about 0.495; or
the molar ratio of ethylamine to the total amount of aldehyde provided by a) is about 0.187 to about 0.48, or
the molar ratio of ethylamine to the total amount of aldehyde provided by a) is about 0.187 to about 0.435; or
the molar ratio of ethylamine to the total amount of aldehyde provided by a) is about 0.187 to about 0.37; or
the molar ratio of ethylamine to the total amount of aldehyde provided by a) is about 0.187 to about 0.31; or
the molar ratio of ethylamine to the total amount of aldehyde provided by a) is about 0.249 to about 0.56; or
the molar ratio of ethylamine to the total amount of aldehyde provided by a) is about 0.249 to about 0.497; or
the molar ratio of ethylamine to the total amount of aldehyde provided by a) is about 0.249 to about 0.48; or
the molar ratio of ethylamine to the total amount of aldehyde provided by a) is about 0.249 to about 0.435, or
the molar ratio of ethylamine to the total amount of aldehyde provided by a) is about 0.249 to about 0.37; or
the molar ratio of ethylamine to the total amount of aldehyde provided by a) is about 0.31 to about 0.37; and
optionally wherein the aldehyde is formaldehyde and water is also present in the solution.

Aspect 69. The method of Aspect 59, wherein the solution further comprises methanol, or wherein the solution further comprises isopropyl alcohol.

Aspect 70. The method as in Aspect 59, wherein the spent scavenger solution phase has a reduced amount of solids formation as compared to that phase formed using same method but carried out in the absence of ethylamine.

Aspect 71. The method as in Aspect 59 further comprising separating the ethylamine-terminated alkenyl sulfide oligomers and/or polymers from the spent scavenger solution phase.

Aspect 72. The method of Aspect 71 further comprising hydrolyzing the ethylamine-terminated alkenyl sulfide oligomers and/or polymers with alkali to release ethylamine and optionally recovering therefrom at least a portion of the ethylamine.

Aspect 73. The method of Aspect 71, wherein at least a portion of the ethylamine is recovered, and the method further comprises recycling the recovered ethylamine to a stream containing an undesirable amount of hydrogen sulfide or to be part of a treatment solution.

Aspect 74. A composition comprising ethylamine-terminated alkenyl sulfide oligomers and/or polymers comprising on average a polymerization reaction product of 2 moles of ethylamine, n moles of hydrogen sulfide, and n+1 moles of an aldehyde, and n is in the range of about 1 to about 12.

Aspect 75. The composition of Aspect 74 in which the aldehyde is selected from the group consisting of formaldehyde, benzaldehyde, furfural, acrolein, glutaraldehyde, glyoxal, and any combination of two or more of the foregoing.

Aspect 76. The composition as in Aspect 74, wherein the aldehyde is formaldehyde.

Aspect 77. The composition as in Aspect 74, wherein the aldehyde is from an aldehyde releaser.

Aspect 78. The composition as in Aspect 77, wherein the aldehyde releaser is formed from i) an aldehyde and ii) a primary or secondary amine, an alkanolamine, an alcohol, or any combination of two or more of the foregoing.

Aspect 79. The composition as in Aspect 78, wherein the aldehyde releaser is formed from i) an aldehyde and ii) methylamine, ethanolamine or ethanol.

Aspect 80. The composition of Aspect 74 in which n is in the range of about 3 to 10.

Aspect 81. The composition of Aspect 74 in which n is in the range of about 7 to about 9.

Aspect 82. A composition formed from ingredients comprising a) an aldehyde and/or an aldehyde releaser, and b) ethylamine, wherein there is less than one molar equivalent of ethylamine in relation to the total amount of aldehyde provided by a), and wherein the ethylamine is in an amount sufficient to inhibit the formation of solid alkenyl sulfide polymers.

The foregoing description of the invention illustrates exemplary embodiments thereof. Various changes may be made in the details of the illustrated composition and process within the scope of the appended claims by one skilled in the art without departing from the teachings of the invention. Existing patents, publications, and/or known art disclosed are incorporated herein by reference to the extent required to provide details and understanding of the disclosure herein set forth. The present invention should only be limited by the claims and their equivalents.

What is claimed is the following:

1. A scavenging composition formed from ingredients comprising
a) an aldehyde and/or an aldehyde releaser,
b) ethylamine, and
c) an alcohol,
wherein the amount of ethylamine used to form the scavenging composition is in the range of 0.2 molar to less than one molar equivalent in relation to the total amount of aldehyde provided by a), and wherein the scavenging composition does not comprise ethanolamine, and wherein the aldehyde releaser is not formed by a reaction of ethanolamine with an aldehyde.

2. The scavenging composition as in claim 1 wherein the aldehyde is selected from the group consisting of formaldehyde, benzaldehyde, furfural, acrolein, glutaraldehyde, glyoxal and any combination of two or more of the foregoing, with the proviso that when the aldehyde is formaldehyde, water is also present in the composition.

3. The scavenging composition as in claim 1 wherein the aldehyde is formaldehyde, and water is also present in the scavenging composition.

4. The scavenging composition as in claim 1 wherein the aldehyde releaser is formed from i) an aldehyde and ii) a primary or secondary amine, an alkanolamine that is not ethanolamine, an alcohol or a combination of any two or more of the foregoing, optionally wherein the aldehyde releaser is formed from i) an aldehyde and ii) methylamine or ethanol.

5. The scavenging composition as in claim 1 wherein the alcohol is a $C_1$-$C_6$ alcohol, a $C_1$-$C_6$ diol, or a $C_1$-$C_6$ polyol; and wherein the $C_1$-$C_6$ alcohol, $C_1$-$C_6$ diol, or $C_1$-$C_6$ polyol is optionally mixed with water.

6. The scavenging composition according to claim 5, wherein the $C_1$-$C_6$ alcohol is selected from the group consisting of methanol, ethanol, and isopropyl alcohol.

7. The scavenging composition as in claim 1, wherein the scavenging composition comprises an amount of ethylamine that is less than one half mole of ethylamine per mole of aldehyde and optionally wherein the aldehyde is formaldehyde and the ingredients further comprise water.

8. A scavenging composition consisting essentially of
a) an aldehyde and/or aldehyde releaser,
b) ethylamine, and
c) an alcohol;
wherein the amount of ethylamine used to form the scavenging composition is in the range of 0.2 molar to less than one molar equivalent in relation to the total amount of aldehyde provided by a).

9. The scavenging composition of claim 8, wherein the molar ratio of ethylamine to the total amount of aldehyde in the treatment solution is 0.2 to about 0.56 and optionally wherein the aldehyde is formaldehyde and the ingredients further comprise water.

10. The scavenging composition of claim 8, wherein the aldehyde is selected from the group consisting of formaldehyde, benzaldehyde, furfural, acrolein, glutaraldehyde, glyoxal and any combination of two or more of the foregoing, with the proviso that when the aldehyde is formaldehyde, water is also present in the composition.

11. The scavenging composition of claim 8, wherein the aldehyde releaser is formed from i) an aldehyde and ii) a primary or secondary amine, an alkanolamine that is not ethanolamine, an alcohol, or any combination of two or more of the foregoing, optionally wherein the aldehyde releaser is formed from i) an aldehyde and ii) methylamine or ethanol.

12. The scavenging composition as in claim 8, wherein the alcohol is a $C_1$-$C_6$ alcohol, a $C_1$-$C_6$ diol, or a $C_1$-$C_6$ polyol; and wherein the $C_1$-$C_6$ alcohol, $C_1$-$C_6$ diol, or $C_1$-$C_6$ polyol is optionally mixed with water.

13. The scavenging composition according to claim 12, wherein the alcohol is a $C_1$-$C_6$ alcohol.

14. The scavenging composition according to claim 13, wherein the $C_1$-$C_6$ alcohol is selected from the group consisting of methanol, ethanol, and isopropyl alcohol.

15. The scavenging composition as in claim 8, wherein the scavenging composition comprises an amount of ethylamine that is less than one half mole of ethylamine per mole of aldehyde and optionally wherein the aldehyde is formaldehyde and the ingredients further comprise water.

16. The scavenging composition as in claim 1, wherein the amount of ethylamine used to form the scavenging composition is in the range of 0.2 molar to 0.75 molar equivalent in relation to the total amount of aldehyde provided by a).

17. The scavenging composition as in claim 1, wherein the amount of ethylamine used to form the scavenging composition is in the range of 0.2 molar to 0.56 molar equivalent in relation to the total amount of aldehyde provided by a).

18. The scavenging composition as in claim 8, wherein the amount of ethylamine used to form the scavenging composition is in the range of 0.2 molar to 0.75 molar equivalent in relation to the total amount of aldehyde provided by a).

19. The scavenging composition as in claim 8, wherein the amount of ethylamine used to form the scavenging composition is in the range of 0.2 molar to 0.56 molar equivalent in relation to the total amount of aldehyde provided by a).

\* \* \* \* \*